(No Model.)

J. PORSCH, Jr.
STOP COCK.

No. 293,515. Patented Feb. 12, 1884.

Witnesses.
W R Edelin
Robt. H. Porter.

Inventor.
John Porsch Jr.
Per Hallock & Hallock
Att's

UNITED STATES PATENT OFFICE.

JOHN PORSCH, JR., OF ERIE, PENNSYLVANIA.

STOP-COCK.

SPECIFICATION forming part of Letters Patent No. 293,515, dated February 12, 1884.

Application filed April 12, 1883. (No model.)

*To all whom it may concern:*

Be it known that I, JOHN PORSCH, Jr., a citizen of the United States, residing at Erie, in the county of Erie and State of Pennsylvania, have invented certain new and useful Improvements in Stop-Cocks; and I do hereby declare the following to be a full, clear, and exact description of the invention, such as will enable others skilled in the art to which it appertains to make and use the same.

This invention consists in providing a new and improved stop-cock or faucet and connecting-coupler therefor, by which the passage may be shut off, so as to repair the packing of the regular shut-off valve.

Figure 1:
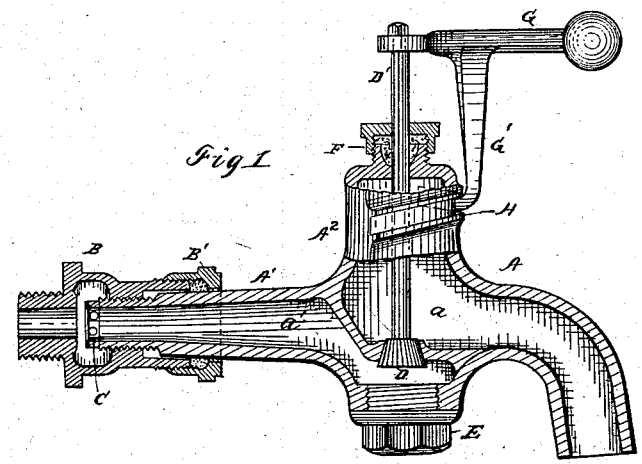
Figure 2:
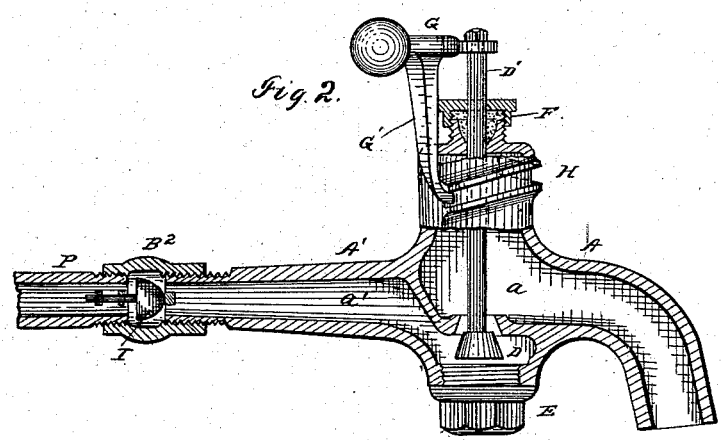
Figure 3:
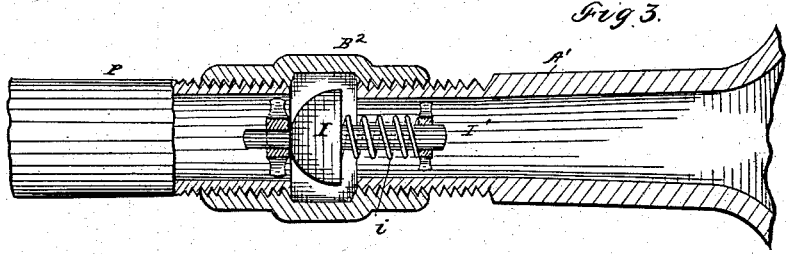

The invention is shown in the accompanying drawings as follows:

Figure 1 is a vertical longitudinal section of the device, with a part of the head $A^2$ in elevation. Fig. 2 is a similar view with the position of parts changed and a modified construction of the coupler shown. Fig. 3 is a sectional view, showing the second modification in the construction of the shut-off coupler.

The first part of the invention relates to the devices for operating the ordinary stop-valve and the construction of the faucet.

The second part of the invention relates to the construction of the shut-off coupler for connecting the faucet to the service-pipe.

The faucet is composed of the front or nozzle part A, the stem A', and the head $A^2$. Within it is divided into two chambers, $a\ a'$, by the valve-partition.

D is the cut-off valve, and D' is its stem, which extends up through a stuffing-box, F, in the head $A^2$. The stem is operated by a crank lever or handle, G G', the part G' being an arm extending down and turned to engage with a screw or cam thread or groove, H, on the outside of the head. By turning the lever G the arm G' moves in the groove H and raises or lowers the valve, as the case may be. The object of this construction is to get a quick movement of the valve. A quarter-turn will open the valve to its fullest extent. The screw-thread, being on the outside of the head, can be more precipitous, and hence a quicker motion be obtained.

Figs. 1 and 2 show the changed position of parts.

The valve may be made to move down to open, as shown, or up; but I prefer it as shown, as the pressure of the fluid in chamber $a'$ will assist in keeping the valve tight when shut. The head $A^2$ has no cap, as usual, but is solid, with a small stuffing-box, F. The valve and stem are put in place through a plugged opening, E, on the lower side of the cock. This opening also affords access to repair the valve or its packing.

The shut-off coupling shown in Fig. 1 is similar to that shown in a patent to me dated October 18, 1881, except that a stuffing-box, B', is used in place of the jam-nut shown in said patent. The object of this coupler is to be able to shut off the water when it is desired to repair the valve D, which is done by turning the faucet A A', so as to screw the parts C and B together.

In Fig. 2 a modified form of coupler is used, in which a valve, I, is seated when the faucet is screwed into the part $B^2$, and is unseated by the pressure of the water when the part A' is screwed out a little.

The modification shown in Fig. 3 is like that in Fig. 2, only the valve I is kept open by a spring, $i$.

I am aware that valves having screw-threaded stems working in screw-threads in the shell are old, and that the interior of a shell has been provided with an inclined surface, upon which an inclined surface or valve operating screw is moved for opening and closing the valve. My device differs from those forms, in that I dispense with one of the screws and place the inclined surface upon the outside of the shell, so that the operator may be able to tell how far the valve is open by the position of the lever upon said surface.

What I claim as new is—

1. In a stop-cock or faucet, the combination of a shell having an inclined surface upon its outside with a vertically-moving valve having a lever which, when moved over the inclined surface, opens or closes the valve, substantially as described.

2. In a stop-cock or faucet, the combination of a valve having a stem, and a lever or handle having an arm, with a head provided with an inclined screw-thread for the arm of the lever, substantially as described.

3. In a stop-cock or faucet, the combination of the shell or body A A' A², having inclined groove H and chambers $a$ $a'$, and provided with stuffing-box F, with the valve D, having stem D', and handle G, having the arm G', substantially as described.

In testimony whereof I affix my signature in presence of two witnesses.

JOHN PORSCH, JR.

Witnesses:
 JNO. K. HALLOCK,
 WILSON P. GRAZIER.